Oct. 29, 1935.   R. H. GIBBS   2,019,257
VALVE CONSTRUCTION
Filed Feb. 17, 1934
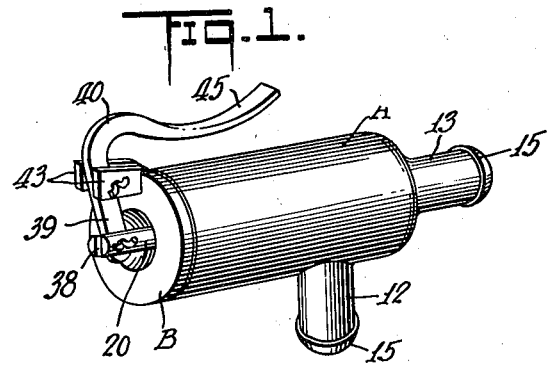
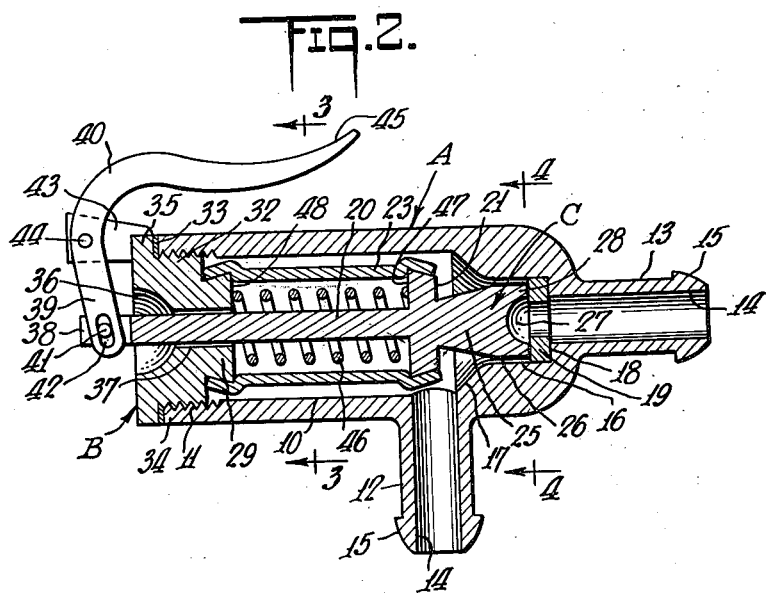
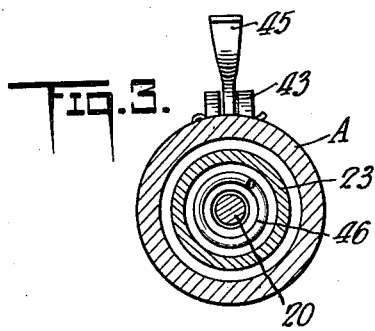
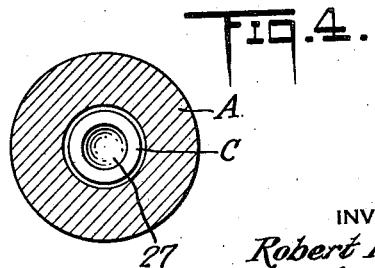
INVENTOR
Robert H. Gibbs
BY Harry Price
ATTORNEY Patented Oct. 29, 1935

2,019,257

UNITED STATES PATENT OFFICE 2,019,257

VALVE CONSTRUCTION

Robert H. Gibbs, Floral Park, N. Y., assignor of one-half to Margaret Blake, Garden City, N. Y.

Application February 17, 1934, Serial No. 711,652

6 Claims. (Cl. 251—134)

The present invention relates to a fluid control device and it particularly relates to a liquid control valve member.

Considerable difficulty has been encountered in making suitable valve members for controlling or valving the flow of fluid or liquid, particularly liquids of a corrosive and/or medicinal character.

Attempts have been made to provide valve means which would enable convenient control of the flow of liquids, particularly of a corrosive and/or medicinal nature from bottles, containers or other dispensing apparatus but most of such devices generally necessarily employ exposed metal parts which prevent them from being utilized in the liquid conduit systems.

An object of the present invention is to provide an improved fluid valving device, particularly adapted for controlling the flow of corrosive and/or medicinal liquids, which will most satisfactorily function without binding or leakage, which will be of inexpensive construction and most readily manufactured and repaired, and which further will be devoid of metallic parts subject to attack by or change caused by liquids of chemical and/or medicinal character.

Another object of the present invention is to provide a valve means adapted to be associated with liquid containers or to form part of liquid dispensing systems which will be reliable in operation, even though of simple and inexpensive construction.

Other objects will be obvious or will appear during the course of the following specification.

In accomplishing the above objects, it has been found most satisfactory to make a valve member of the plunger type, the main structural elements of which may be molded of a plastic material, such as bakelite, hard rubber, and so forth.

In the preferred construction a resilient means is employed taking the form of a coil spring, but this metallic coil spring is enclosed at all times within a flexible casing member. This casing member preferably takes the form of a rubber tube and will permit ready reciprocation of the plunger valve.

The accompanying drawing shows one embodiment of the various possible embodiments of the present invention to which the invention is not restricted.

In the drawing,

Fig. 1 is a perspective view of one embodiment of the preferred valve member of the present invention, Fig. 2 is a longitudinal sectional view upon an enlarged scale.

Fig. 3 is a cross sectional view upon the line 3—3 of Fig. 2, and

Fig. 4 is a cross sectional view upon the line 4—4 of Fig. 2.

Referring to Figs. 1 to 4, the valve is preferably formed of a main body member A, cap member B and a plunger member C, all of which may be formed of plastic moldings, such as of hard rubber, of phenolformaldehyde resins, or of other suitable materials.

Referring to Fig. 2, the body A may be of cylindrical, hexagonal, octagonal and other shapes, the cylindrical shape being illustratively shown in the drawing, and is provided with a cup-shaped cavity 10 which is interiorly threaded at 11 to receive the cap member B. The body is provided with the projecting liquid nipples and inlet and outlet connections 12 and 13, which are preferably molded integral therewith and provided with the central bores 14. The ends of the nipples are provided with the mushroom enlargements 15 and, if desired, may be threaded to receive suitable liquid conduits or rubber hose connections.

According to the preferred use of the valve of the present invention, the nipple 12 serves as an inlet nipple, and, if desired, may be inserted into the stopper or cork of a bottle, while the nipple 13 serves as an outlet nipple and may be suitably connected with a liquid conduit.

The bottom of the interior chamber 10 is provided with a cylindrical portion 16 of reduced diameter, which begins substantially at the bore 14 of the nipple 12 with the inwardly curved portion 17, as indicated.

The bottom of the reduced diameter portion 16 is provided with a shoulder 18 which receives the annular disk or valve seat member 19, adapted to contact with the valve member C.

The valve member C is provided with a stem 20, which is provided with the enlargement 21. The enlargement is exteriorly of frusto-conical shape to extend and receive in liquid-tight fashion the lower end of the rubber tube 23.

Beyond the enlargement 21 the valve member C is provided with reduced diameter frusto-conical extension 25 which terminates in a cylindrical member 26, the terminal face of which is provided with a recess 27 to form an annular lip or edge 28, which is pressed against and closely contacts with the washer 19.

The other side of the rubber or collapsible tube 23 is stretched onto the frusto-conical nipple 29. The cap member B is also provided with an enlarged threaded portion 32 which cooperates with the threaded portion 11 of the member A, the end of the cap B being provided with a flange or ledge 35 which is adapted to press the gasket 33 against the top 34 of the cup member A, as indicated.

The cap member B is provided with a recess 36 and with the bore 37 which receive the outward extension of the stem 20. The stem 20 beyond the cap B is provided with a slot 38, into which fits the extension 39 of the handle 40. A split pin 41 preferably extends through the end of the stem 20, through said slot 38 and through the slot 42 in the handle 40. This forms pivotal connection between the handle 40 and the stem 20, by which the valve C may be raised from its seat 19.

The cap B is preferably provided with a clevised extension 43 between which extends the handle 40 as shown best in Figs. 1 and 2, to which the handle 40 is pivotally connected by the split pin 44. The end of the handle 45 is flattened, as indicated at 45 so that it may be conveniently pressed down by the finger or hand against the cylindrical body of the valve member A and enable opening of the valve C.

It will be noted that the valve C is returned to its seat 19 by the coil spring 46 which reacts between the inside face 47 of the enlargement 21 and the inside face 48 of the nipple 29. The spring serves to bias the lip 28 of the valve plunger member C against the valve seat 19 at all times when the lever 40 is not actuated to lift the valve C from its seat.

The operation of the device is readily apparent. By manipulating the lever 40 it is possible to permit flow of fluid from the nipple 12 to the nipple 13, from a bottle or conduit to another outlet conduit as may be desired. The only metal part, namely, the spring 46, is completely enclosed and protected by the rubber tube 23. If desired, the stem 20 and the handle 40, as well as the clevis 43 may be made of metal to increase the strength thereof.

In the construction, as shown, it is assumed that the valve C will accurately and certainly seat without leakage since it will be guided to its seat by the interior dished portion 17 of the lower end of the body A.

Instead of the slotted connection 38, the end of the lever 40 may be clevised to enclose the valve stem 20 and be pivotally connected to it at such enclosure.

Instead of split pins 41 and 44, other pivotal fastenings may be employed.

A particular feature of the present invention resides in the fact that the valve elements are constructed of materials inert to medicinal liquids, such as salt solutions useful for douches, irrigations and so forth, for example, in connection with nose and throat ailments, wounds, vaginal and rectal purposes. It will be noted that the nipple 12 may be directly inserted into the stopper or outlet orifice of a container or bottle.

The size may widely vary, as for example, from approximately 2½ inches in length and 1 inch in diameter to 20 inches in length and 10 inches in diameter.

The coil spring 46 will reinforce the tube 23 against collapsing under pressure. The tube 23 may be attached additionally to the frusto-conical elements 21 and 29 by an inert adhesive, if desired.

What is claimed is:—

1. A valve device adapted to be utilized for corrosive and/or medicinal liquids, comprising a body member, a cap member and a valve plunger member, all of which are molded of a plastic corrosive-resistant material, said body member taking the form of a cylinder with an inlet and an outlet, the main portion of said body being provided with a cylindrical bore causing the body to take the form of a cup, the outer edge of which is threaded to receive the cap member, the bottom portion of the interior chamber of said cup being provided with a portion of reduced diameter toward said outlet nipple which forms a shoulder adjacent the inlet to the outlet nipple, and a pliable annular valve seat member seated upon said shoulder to cooperate with said valve plunger, said valve plunger member being provided with a coil spring biasing said valve plunger against and toward said annular valve seat member, said cap member and said valve plunger member being provided with shoulder portions, with conically shaped outside portions diverging toward each other, said spring reacting between said shoulders on said cap member and on said valve plunger member and a rubber tube enclosing said coil spring and stretched at its ends onto said conically shaped portions.

2. A valve device adapted to be utilized for corrosive and/or medicinal liquids, comprising a body member, a cap member and a valve plunger member, all of which are molded of a plastic corrosive-resistant material, said body member taking the form of a cylinder with an inlet and an outlet, the main portion of said body being provided with a cylindrical bore causing the body to take the form of a cup, and a pliable valve seat member seated in the bottom of said cup; and said plunger member being provided with a stem projecting out of said cup and with a head portion, the end face of which head portion is provided with a recess to form an annular lip to contact with said valve seat member, said valve plunger member being actuated by a coil spring to close the valve and a rubber tube enclosing said coil spring, said valve device being provided with abutment members against which said spring reacts and which are received by and stretch the ends of said tube.

3. A valve member adapted to be utilized for corrosive and/or medicinal liquids, comprising a body member, a cap member and a valve plunger member, said body member taking the form of a cup, provided with an inlet and an outlet, the bottom portion of the interior of said cup being provided with a shoulder adjacent the outlet and a pliable annular valve seat member on said shoulder; said valve plunger member being provided with a stem and being provided with an annular lip to contact with said valve seat member; said cap member being provided with a central opening through which said stem projects outwardly of the main cup-shaped body; a resilient member reacting between said plunger member and said cap, a rubber tube enclosed within said cup in turn enclosing said resilient member; and a handle pivotally connected to said stem member and said cap member, whereby the valve may be lifted from said seat against the force of said resilient member.

4. A valve member adapted to be utilized for corrosive and/or medicinal liquids, comprising a body member, a cap member and a valve plunger member, said body member having an inlet and an outlet and taking the form of a cup, the outer edge of which receives the cap member, the bottom portion of said cup being provided with a shoulder adjacent the outlet and a pliable annular valve seat member on said shoulder; said valve plunger member being provided with a stem, and with an annular lip to contact with said valve seat member; said cap member being provided with a central opening through which said stem projects outwardly of the main cup-shaped body portion and said body member being provided with a rubber encased coil spring reacting between the said cap and said plunger member; and a handle pivotally mounted on said cap member, whereby the valve may be lifted from said seat against the force of said coil spring.

5. A valve device comprising a body member, a cap member and a valve plunger member, said body member taking the form of a cup, provided with an inlet and an outlet, the bottom portion of said cup being provided with a pliable annular valve seat member; said valve plunger member being provided with an annular lip to contact with said valve seat member; a resilient member reacting between said plunger member and said cap, a rubber tube enclosed within said cup and in turn enclosing said resilient member; and a handle connected to said stem member and said cap member, whereby the valve may be lifted from said seat against the force of said resilient member, said cap member and said valve plunger member being provided with shoulders having conically shaped side edge portions, against which shoulder said resilient member reacts and the ends of said rubber tube being stretched onto said conically shaped edge portions.

6. A valve construction including a casing, nipple inlet and outlet connections to said casing, a reciprocating valve element in said casing, said casing carrying a valve seat for said valve element and operating connections to reciprocate said valve element, said valve construction being provided with a resilient metal element pressing the valve element to its seat, and a rubber tube enclosing said resilient element, said casing and valve element being provided with means to hold the ends of said tube in liquid-tight fashion, said valve element and said casing element being provided with rubber tube receiving portions of substantially larger diameter than said rubber tube, and said rubber tube being stretched onto said larger portions.

ROBERT H. GIBBS.